US012468307B2

(12) United States Patent
Clare et al.

(10) Patent No.: US 12,468,307 B2
(45) Date of Patent: Nov. 11, 2025

(54) DETERMINATION OF TASK AREA BOUNDARIES DURING DRIVER-ASSISTED CONSTRUCTION VEHICLE OPERATION

(71) Applicant: Trimble Inc., Sunnyvale, CA (US)

(72) Inventors: Adam Clare, Broomfield, CO (US); Megan Marotz, Lafayette, CO (US); Geoffrey Kirk, Broomfield, CO (US)

(73) Assignee: Trimble Inc., Westminster, CO (US)

( * ) Notice: Subject to any disclaimer, the term of this patent is extended or adjusted under 35 U.S.C. 154(b) by 204 days.

(21) Appl. No.: 17/974,439

(22) Filed: Oct. 26, 2022

(65) Prior Publication Data
US 2024/0142983 A1 May 2, 2024

(51) Int. Cl.
G05D 1/00 (2024.01)
(52) U.S. Cl.
CPC .......... *G05D 1/0274* (2013.01); *G05D 1/0219* (2013.01); *G05D 1/0221* (2013.01); *G05D 1/0287* (2013.01)
(58) Field of Classification Search
CPC .. G05D 1/0274; G05D 1/0219; G05D 1/0221; G05D 1/0287; G05D 1/6484; G05D 2105/05; G05D 2107/90; G05D 2109/10; G05D 1/2297; E02F 9/262; E02F 9/205; E02F 9/2054; E02F 3/841; E02F 3/438; E02F 9/2045
USPC .......................................................... 701/25
See application file for complete search history.

(56) References Cited

U.S. PATENT DOCUMENTS

| | | | |
|---|---|---|---|
| 2006/0178823 A1 | 8/2006 | Eglington et al. | |
| 2017/0342684 A1* | 11/2017 | Sherlock | E02F 3/844 |
| 2017/0357268 A1 | 12/2017 | Downing et al. | |
| 2018/0348774 A1* | 12/2018 | Downing | G05D 1/0219 |
| 2022/0269278 A1* | 8/2022 | Nishii | G05D 1/0219 |

OTHER PUBLICATIONS

Extended European Search Report for Application No. 23204554.2-1205, date of completion of report Feb. 21, 2024, 9 pages.
Office Action for Application No. 23 204 554.2-1201, mailed Jul. 30, 2025, 7 pages.

* cited by examiner

*Primary Examiner* — Aniss Chad
*Assistant Examiner* — Hussam Aldeen Alzateemeh
(74) *Attorney, Agent, or Firm* — Kilpatrick Townsend & Stockton LLP

(57) ABSTRACT

Construction vehicles using a teach and repeat system can ascertain boundaries of a task area while working, without knowing a perimeter of the task area before starting the task. The system maps a first path of the vehicle by recording a position of a vehicle moving from a first start position to a first end position. A second path is predicted, based on a shape of the first path, the second path having a second start position and a second end position. A third path is mapped from a third start position to a third end position. Boundaries of the task area are ascertained based on the first path, the first start position, the second start position, the third start position, the third path, the first end position, the second end position, and the third end position.

20 Claims, 8 Drawing Sheets

DETERMINATION OF TASK AREA BOUNDARIES DURING DRIVER-ASSISTED CONSTRUCTION VEHICLE OPERATION

BACKGROUND

This disclosure relates in general to surveying systems. Surveying determines positions of points relative to each other and/or to the Earth. Surveying can be used in many applications by land surveyors, construction professionals, and civil engineers. Surveying often uses specialized and/or expensive equipment, such as laser levels, surveying rods, total stations, laser scanners, and GNSS (Global Navigation Satellite System) receivers. Examples of GNSS systems include GPS (Global Positioning System), GLONASS (Russia), BeiDou Navigation Satellite System (China), and Galileo (European Union).

BRIEF SUMMARY

This disclosure relates in general to autonomous and semi-autonomous vehicles, and without limitation, to driver-assisted machines at a construction site.

In certain embodiments, a system for using a vehicle to ascertain boundaries of a task area comprises the vehicle and one or more memory devices. The one or more memory devices contain instructions that, when executed by one or more processors, perform the following steps: receiving a first input from an operator of the vehicle while the vehicle is at a first start position; recording a position of the vehicle as the vehicle moves from the first start position; receiving a second input from the operator; recording a first end position, based on receiving the second input from the operator; mapping a first path of the vehicle based on the first start position, the first end position, and recording the position of the vehicle as the vehicle moves from the first start position to the first end position; predicting a second path, based on a shape of the first path, wherein the second path has a second start position and a second end position; automatically steering the vehicle along the second path; mapping a third path, the third path being defined by a third start position and a third end position; and/or ascertaining boundaries of the task area. Ascertaining boundaries of the task area can be based on: a first boundary of the task area defined by the first path; a second boundary of the task area defined by the first end position, the second end position, and the third end position; a third boundary of the task area defined by the third path; and/or a fourth boundary of the task area defined by the first start position, the second start position, and the third start position.

In some embodiments, there are a plurality of paths between the second path and the third path; the system further comprising a tool coupled with the vehicle, and the instructions further cause the one or more processors to record a parameter of the tool while the vehicle traverses the first path, and/or using the parameter of the tool while the vehicle is automatically steered along the second path; the system further comprising a display coupled with the vehicle, wherein the display is a computer coupled with the vehicle configured to receive operator input and to display graphical information to the operator of the vehicle, and/or the first input and/or the second input are received at a display; and/or the instructions further cause the one or more processors to amend the second path based on receiving input from the operator via the display.

In certain embodiments, a method for using a vehicle to ascertain boundaries of a task area comprises receiving a first input from an operator of the vehicle while the vehicle is at a first start position; recording a position of the vehicle as the vehicle moves from the first start position; receiving a second input from the operator; recording a first end position, based on receiving the second input from the operator; mapping a first path of the vehicle based on the first start position, the first end position, and recording the position of the vehicle as the vehicle moves from the first start position to the first end position; predicting a second path, based on a shape of the first path, wherein the second path has a second start position and a second end position; automatically steering the vehicle along the second path; mapping a third path, the third path being defined by a third start position and a third end position; and/or ascertaining boundaries of the task.

In some embodiments, the operator is in the vehicle while receiving the first input and/or while receiving the second input; the method comprises stopping and reversing the vehicle between the first end position and the second start position; there are a plurality of paths between the first path and the third path; the method further comprises optimizing the plurality of paths, after mapping the third path; the method further comprises the vehicle returning to the first start position and the automatically traversing the first path, the second path, and the third path, after mapping the third path; the second start position is separated from the first start position based on a percentage of a width of a tool of the vehicle; the method further comprises recording a speed of the vehicle along the first path and automatically steering the vehicle along the second path at the speed of the vehicle recorded along the first path; the method further comprises recording a parameter of a tool of the vehicle along the first path, and automatically using the parameter of the tool along the second path; the method further comprises identifying an obstacle based on the plurality of paths; the method further comprises transmitting the boundaries and/or paths to another vehicle; there are a plurality of paths between the first path and the third path; the method further comprises optimizing the plurality of paths, after mapping the third path; optimization includes optimizing path spacing and/or speed optimization of the vehicle; the second start position is separated from the first start position based on a percentage of a width of a tool of the vehicle; the vehicle is a first vehicle; the method further comprises transmitting at least a portion of the first path to a second vehicle before the first vehicle traverses the second path; the second path is based on a path of the second vehicle; and/or the method further comprises identifying an obstacle based on the plurality of paths, and/or transmitting a location of the obstacle from the vehicle to a device coupled with another vehicle.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Before some computer-controlled vehicles operate in a construction zone task area, boundaries of the task area are measured, to control the vehicle within the task area. For example, a perimeter of the task area is driven while recording the position of the vehicle, or the perimeter of the task area is pre-surveyed. However, driving the perimeter of the boundary or pre-surveying the perimeter can take time and/or delay the start of a task. By using teach and repeat processes, a task can be started before the perimeter of the task area is known, and the boundary of the task area can be ascertained during performance of the task. This can allow less time before the task can be started and/or eliminate a step of first ascertaining the boundary of the task area before the task is started.

Figure 1:
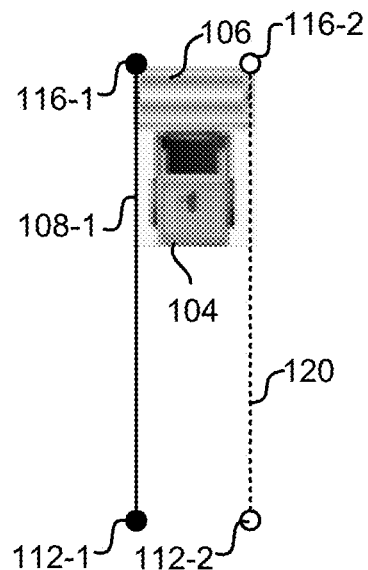
FIG. 1 depicts a diagram of an embodiment of using a vehicle to ascertain boundaries of a task area.

Referring first to FIG. 1, a diagram of an embodiment of using a vehicle 104 to ascertain boundaries of a task area is shown. The vehicle is a construction vehicle operating in a task area. The vehicle 104 comprises a tool 106. For example, the tool 106 is attached to the vehicle 104. Examples of tools include a compactor, a blade, a mower, and a ripper. The vehicle 104 comprises, or interfaces with, a computer system. The computer system includes a user interface. For example, a display comprising a screen and a CPU is used to present information to the user and to receive inputs from the user. The vehicle 104 is driven along a first path 108-1. Sensors monitor the vehicle 104 and/or the tool 106 as the vehicle 104 is driven along the first path 108-1.

While the vehicle 104 is at the first start position 112-1, the system receives a first input from an operator of the vehicle 104 (e.g., by the user touching a button on the display and/or pressing the acceleration pedal of the vehicle). The first input triggers the system to record the start position, trajectory, speed, and/or tool properties of the vehicle as the vehicle moves from the first start position 112-1. In some embodiments, GPS is used to record the start position and/or track the vehicle. Other sensors (e.g., inertial sensors) can also be used. The vehicle 104 drives along the first path 108-1. When the vehicle 104 reaches the end of the first path 108-1 the user provides a second input (e.g., by pressing a button on the display and/or stopping the vehicle 104). In the embodiment shown, the path 108 is recorded based on a front, left corner of the vehicle 104. In some embodiments, the path 108 is based on another portion of the vehicle 104 (e.g., a center of the vehicle, the front, right corner of the vehicle, etc.). A first end position 116-1 is recorded, based on receiving the second input from the operator. The first path 108-1 is mapped from the first start position 112-1 to the first end position 116-1 based on recording the path of the vehicle as the vehicle moves from the first start position 112-1 to the first end position 116-1.

The system then predicts one or more predicted paths 120, based on the first path 108-1. The predicted path 120 in FIG. 1 is a prediction of a second path that the vehicle 104 is to travel. The predicted path 120 has a predicted second start position 112-2 and a predicted second end position 116-2. Driver assist is then used to move the vehicle from the first end position 116-1 to the predicted second start position 112-2, move the vehicle 104 from the predicted second start position 112-2 to the predicted second end position 116-2, control the speed of the vehicle 104 based on the speed of the vehicle moving along the first path 108-1, and/or control one or more parameters of the tool 106 of the vehicle 104 based on recorded parameters of the tool 106 while the vehicle is moved along the first path 108-1. In some embodiments, the operator can adjust the predicted second start position 112-2, the predicted second end position 116-2, and/or the predicted path 120 using the display and/or by manually overriding the driver assist.

In some embodiments, the predicted path 120 is based on a shape of the first path 108-1. For example, the first path 108-1 in FIG. 1 is a straight line, so the predicted path 120 is also a straight line. If the first path 108-1 were curved (e.g., turning or wavy line), then the predicted path 120 would have a similar curve.

Figure 2:
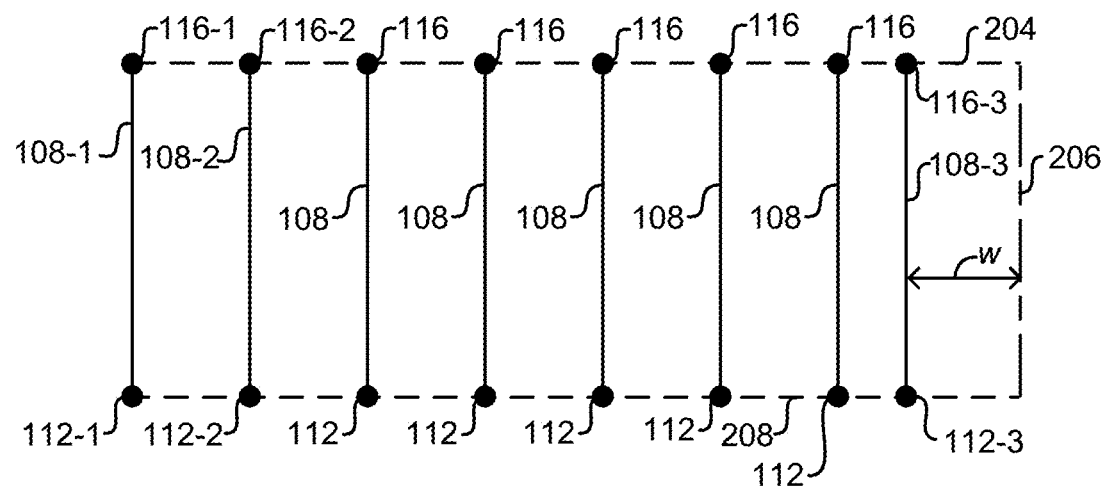
FIG. 2 depicts an embodiment of boundaries ascertained by the vehicle.

FIG. 2 depicts an embodiment of boundaries ascertained using the vehicle (e.g., vehicle 104 in FIG. 1). In FIG. 2, the first path 108-1, a second path 108-2, a third path 108-3, and a plurality of paths 108 between the second path 108-2 and the third path 108-3 of the vehicle are shown. The paths 108 are mapped based on tracking the vehicle 104.

The third path 108-3 is defined by a third start position 112-3 and a third end position 116-3. Ascertaining boundaries of the task area is based on a first boundary defined by the first path 108-1. The first boundary could be the first path 108-1 or a defined offset from the first path 108-1. A second boundary 204 of the task area is defined by the end positions 116. For example, the second boundary 204 could be a straight line through the end positions 116 (as shown in FIG. 2) or could be fit to a line (e.g., such as a polynomial fit to the end positions 116, if the end positions 116 were not in a straight line). A third boundary 206 of the task area is defined by the third path 108-3. The third boundary could be the third path 108-3 or an offset (e.g., a width w of the tool 106 in FIG. 6, as shown in FIG. 2) from the third path 108-3. The fourth boundary 208 of the task area is defined by start positions 112. For example, the fourth boundary 208 could be a straight line through the start positions 112 (e.g., as shown in FIG. 2) or could be fit to a line (e.g., such as a polynomial fit to the start positions 112, if the start positions 112 were not in a straight line).

The first boundary and the third boundary 206 can be referred to edges of the task area, the second boundary 204 can be referred to as the start line, and the fourth boundary 208 can be referred to as the end line.

Figure 3:
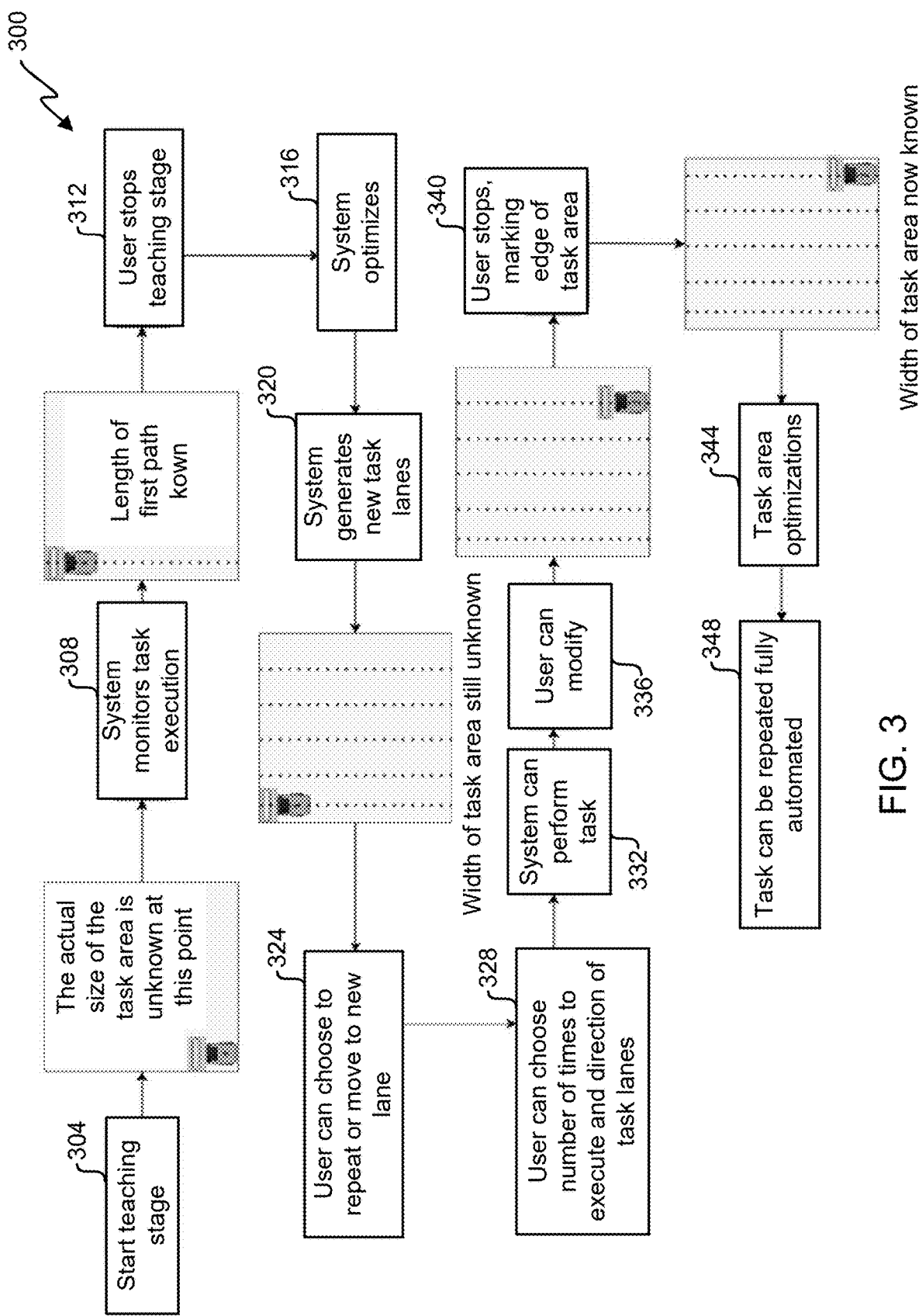
FIG. 3 depicts a diagram of an embodiment of a process for ascertaining boundaries of a task area.

FIG. 3 depicts a diagram of an embodiment of a teach and repeat process 300. Process 300 can be used for ascertaining boundaries of a task area and/or for automating/assisting in repeated tasks. In some embodiments, the teach and repeat process 300 is used for automatic generation and/or execution of a task from monitoring a user. This can allow less steps and reduce time to start working. Some current solutions require driving the perimeter of a task area, or pre-surveying the perimeter. By using the teach and repeat process 300 shown in FIG. 3 a user can start work without driving the perimeter or pre-surveying the perimeter, in some embodiments.

Sensors (e.g., image, GNSS, inertial, etc.) on a machine are used to record (e.g., continuously) the position, velocity, and/or orientation of the machine. The user indicates (e.g., via a UI button) that the user wants the machine to start a teaching stage, step 304. For example, user presses a button on the machine while the machine is at a start point of a first lane (e.g., at the first starting position 112-1 and FIG. 1). Receiving indication from the user to start the teaching stage marks a starting point of a path. The user then starts executing one or more tasks manually (e.g., pushing dirt or compacting a line) along the first lane.

The system monitors the speed, position, orientation, and/or implement (e.g., tool 106 in FIG. 1) state, step 308. For example, the system monitors position of the machine, speed of the machine, blade up/down, compaction on/off, and/or machine control enabled/disabled while the user is working.

Once the user has finished the first lane (end of pad, or dirt area) the user stops the teaching stage, step 312 (e.g., by pressing a button or simply bringing the machine to a stop). In some embodiments, a simple four-directional button pad could be used, up/down indicating a change in length (or direction), and left/right indicating a change in direction. Stopping the teaching stage determines an end position of the first path. In some embodiments, the teaching stage is ended by a teach signal. Example of teach signals include: a work implement signal (e.g., for a compactor, vibe is turned on/off), switching lanes (e.g., via a button press), and/or changing direction (forward, neutral, reverse (FNR)) on the lane.

The system can then use recorded data during the teaching stage to replicate and/or automate the task by controlling the steering, speed, and implement of the machine. In some embodiments, optimization step 316 is used (e.g., for safety checks, lane optimizations for curved lanes, etc).

In step 320, the system generates new task lanes (e.g., predicted path(s) 120 shown in FIG. 1). The system is also able to automatically generate new task lanes by using the machine information (e.g., width, blade size, drum width).

In step 324, the user can choose to have the system either repeat the task on the current lane or have the system move the machine to an automatically generated next task lane.

In step 328, user can choose a number of times a task is executed and/or a direction of a next task lane. For example, user can instruct the machine to repeat compacting one lane three times and then move to a lane to the right.

In step 332, the machine then performs the task (e.g., automatically), controlling steering, speed, and/or implement properties.

In step 336, the user can modify a length of one or more lanes. If the user desires to change a length of a lane, the user can use the display (e.g., by dragging a pin drop) or use a teaching signal to adjust that lane's length.

In step 340, the user can stop repeating a task, marking an end of the task area (e.g., marking the third boundary 206 in FIG. 2). In some embodiments, lanes are repeated by the machine until the system receives an input from the user to stop.

In step 344, optimization of the machine in the task areas performed. For example, task lanes can be evenly distributed within the task area.

In step 348, one or more tasks can be repeated within the task area (e.g., fully automated). In some embodiments, boundaries of the task area are transmitted to another machine for performing similar or different tasks within the task area. In some embodiments, the user may request the machine or a different machine to complete work autonomously within the boundaries of the task area. The boundaries of the task area can be saved (e.g., locally and/or transmitted to a remote server) for possible future work by the same machine or a different machine or purpose.

Many construction tasks (e.g., dozing, grading, compacting) are repetitive in both (a) a task area (e.g., the same area will get worked multiple times) and (b) a sequence of steps to execute a task (e.g., compacting one lane multiple times at the same speed/vibration each time).

Using process 300 can avoid using a pre-survey, or driving a perimeter of the task area, to determine the task area boundaries. By not having to pre-survey the task area or drive the perimeter of the task area can reduce work and save time. Then after learning a task (e.g., compacting a lane), the machine can repeat the task automatically (e.g., autonomously and/or control assist to a user). After learning the task area boundaries, the machines can automatically repeat one or more tasks within the task area. Additionally, by recording paths of the machine, optimizations can be made (e.g., optimize lane widths).

Figure 4:
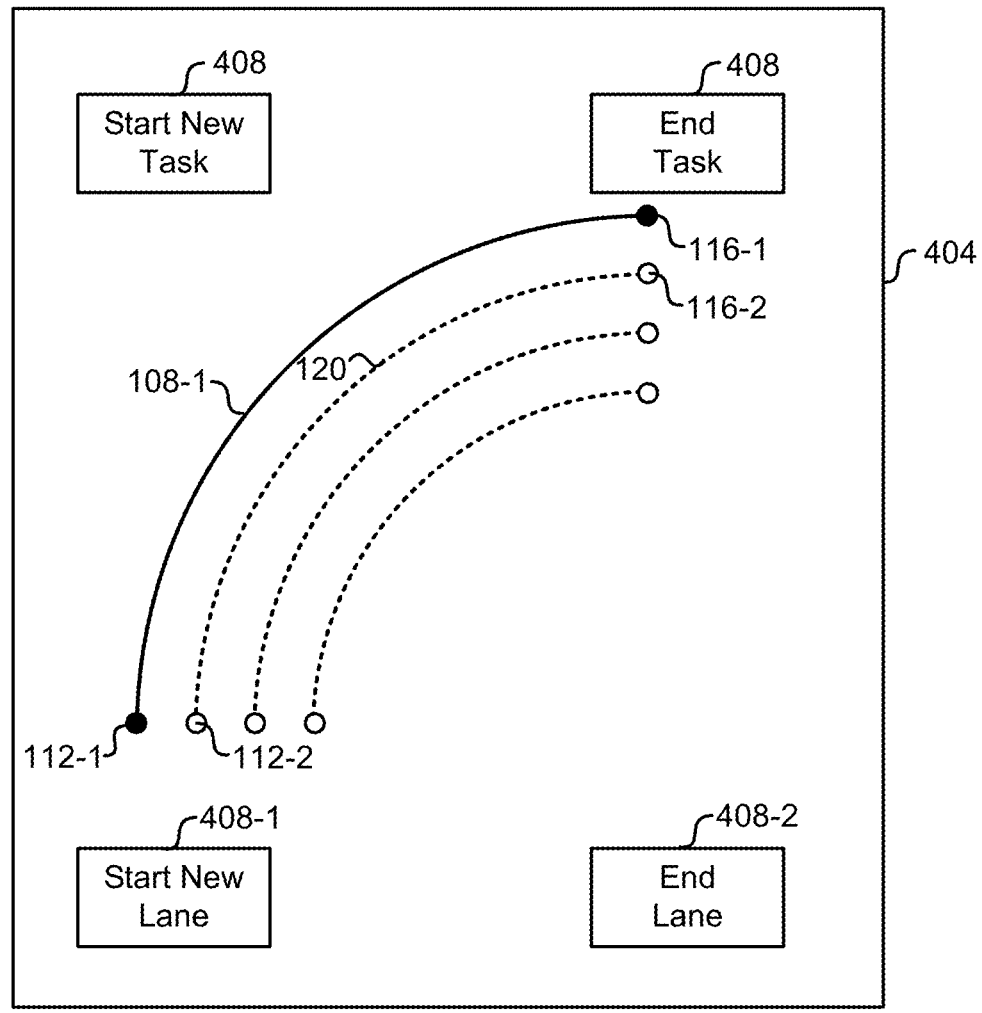
FIG. 4 depicts an embodiment of a display showing curved estimated paths.

FIG. 4 depicts an embodiment of a display 404 showing curved paths. A system can further comprise a display 404 coupled with the machine. The display 404 is a computer coupled with the vehicle configured to receive operator input and to display graphical information to the operator of the vehicle. For example, a display 404 is positioned within a cab of the machine, so that an operator can see and/or interact with the display 404 while operating the vehicle. The display 404 can present virtual buttons 408 on the display 404 (e.g., for receiving input from the operator). For example, the operator can tap (e.g., a first input) a first virtual button 408-1, while the vehicle is at the first start position 112-1, to start a new lane; and the operator can tap (e.g., a second input) a second virtual button 408-2, while the vehicle is at the first end position 116-1, to end the lane.

A predicted path 120 is shown on the display 404 having a similar curve as a first path 108-1. The predicted path 120 is an extrapolated shape based on a first path 108-1. The predicted path 120 is curved and shorter than the first path 108-1.

In some embodiments, the user can amend the predicted path 120 by touching, holding, and/or moving a portion of the predicted path 120 using the display 404. For example, the user could touch and move the second start position 112-2, the second end position 116-2, and/or a point of the predicted path 120 between the second start position 112-2 and the second end position 116-2. Thus, the user can define start positions 112 and/or and positions 116 using the display 404.

The user can also amend paths using controls of the machine. For example, as the machine traverses the predicted path 120 the user can manually override the machine (e.g., to go faster, slower, deviate from the path, and/or change a tool property). In some embodiments, graphics of the display overlay an image, such as a satellite image of the area.

Figure 5:
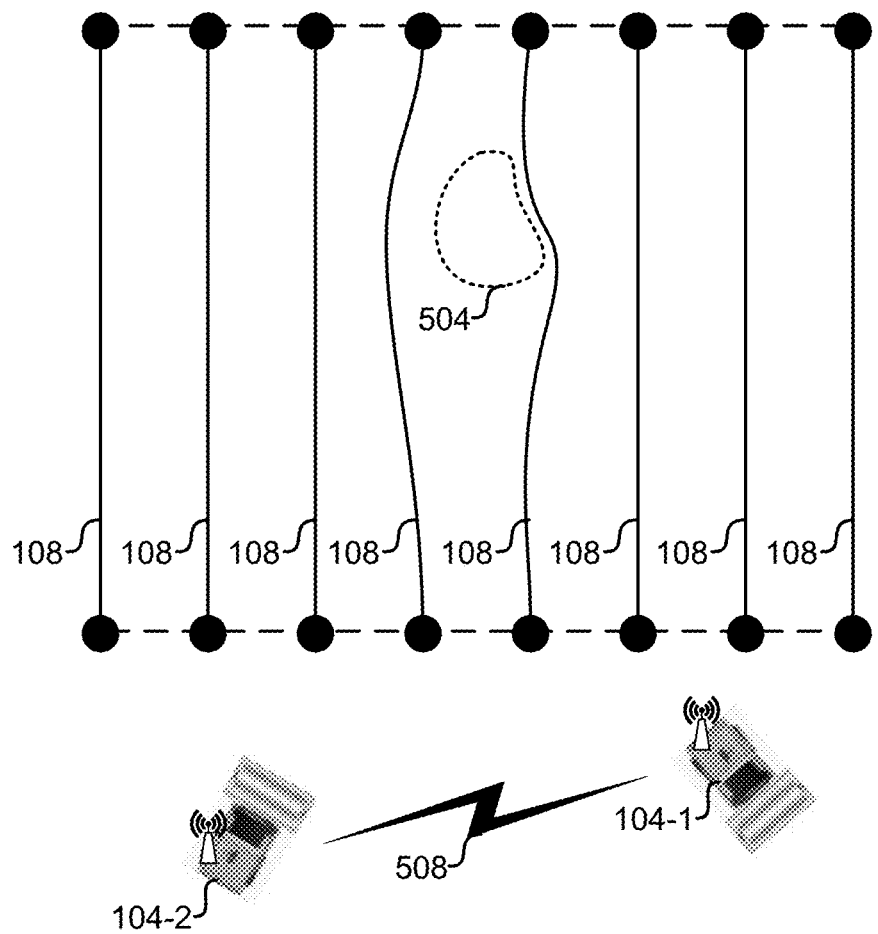
FIG. 5 depicts an embodiment an identification of a hazard.

FIG. 5 depicts an embodiment of identification of an obstacle 504. The obstacle 504 is identified based on a plurality of paths 108. The plurality of paths 108 and FIG. 5 are substantially parallel, except for one path 108 bends to the left and another path bends to the right. Paths 108 that uniquely bend can indicate an obstacle 504 or other feature. For example, a path could indicate a road, a ditch, or pile of material. In some embodiments, the user can select from multiple line forms to replicate, such as using a straight line or curved line as a predicted path (e.g., instead of a path that has a bend in it).

Data about a task area can be transmitted from a first vehicle 104-1 to a second vehicle 104-2 (e.g., via datalink 508). In some embodiments, the datalink 508 is a direct or indirect wireless link. Data about the task area includes such things as boundaries, paths, obstacles, and/or features. For example, the first vehicle 104-1 sends locations of boundaries of the task area and also estimated boundaries of the obstacle 504 to the second vehicle 104-2. The second vehicle 104-2 could be a same type of vehicle as the first vehicle 104-1 to complete a similar or different task. In some embodiments, the second vehicle 104-2 is a different type of vehicle than the first vehicle 104-1 (e.g., to complete a different task). For example, the first vehicle 104-1 could be a water truck spraying water on the task area and the second vehicle 104-2 could be a compactor. By transmitting data of the boundaries and/or the obstacle 504, the second vehicle 104-2 already know the boundaries and/or alert the user of the second vehicle 104-2 to the obstacle 504 (and/or automatically steer around the obstacle 504). In some embodiments, data about the task area can be saved to a database, which can be accessed by the same or other vehicles 104.

Figure 6:
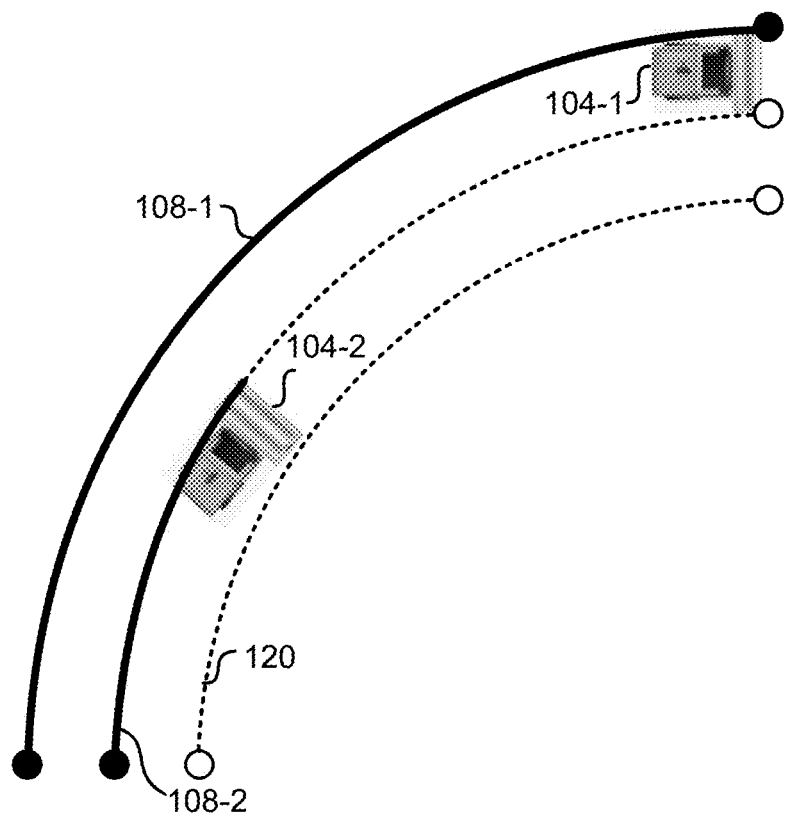
FIG. 6 depicts an embodiment estimating paths for a plurality of construction vehicles.

FIG. 6 depicts an embodiment estimating paths for a plurality of construction vehicles. FIG. 6 depicts a first vehicle 104-1 and a second vehicle 104-2. The first vehicle 104-1 is traversing a first path 108-1. The second vehicle 104-2 is traversing a second path 108-2. The first vehicle 104-1 is transmitting at least a portion of the first path 108-1 to the second vehicle 104-2, before the first vehicle 104-1 traverses a predicted path 120. The predicted path 120 is based on the second path 108-2 of the second vehicle 104-2. For example, the first vehicle 104-1 and the second vehicle 104-2 in FIG. 6 are scrapers, graders, dozers, snowplows, rippers, or compactors, working together. In some embodiments, the second vehicle 104-2 in FIG. 6 is an autonomous or remotely controlled vehicle, following the path of the first vehicle 104-1. Though two vehicles 104 are shown, more than two vehicles can be used together (e.g., four graders could be used on four different paths and adjusting their paths passed on the first vehicle). Predicted paths provide an operator in the second vehicle to verify and/or adjust the predicted path for the second vehicle.

Figure 7:
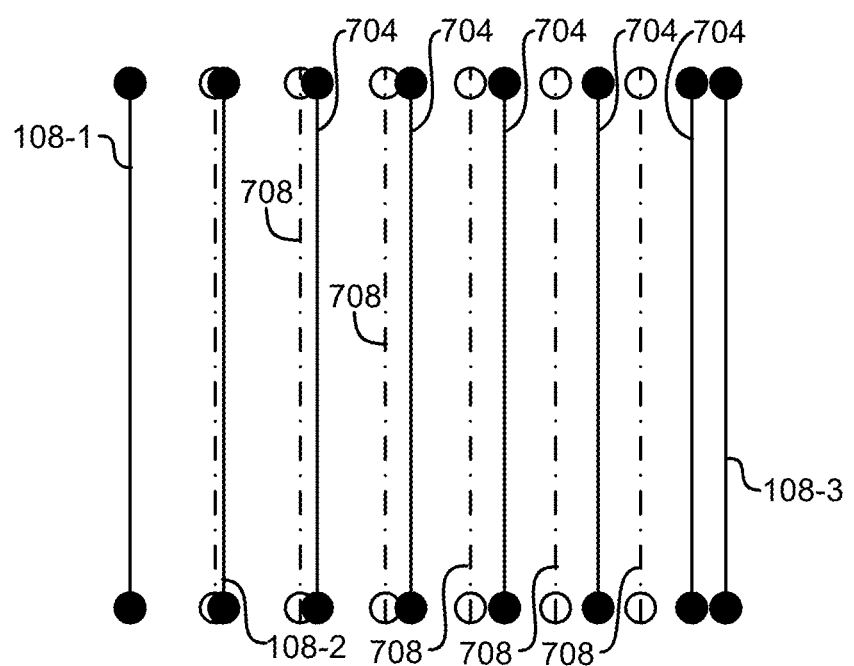
FIG. 7 depicts an embodiment of path optimization.

FIG. 7 depicts an embodiment of path optimization. FIG. 7 depicts a first path 108-1, a second path 108-2, a third path 108-3, and a plurality of paths 704 between the first path 108-1 and the third path 108-3. The plurality of paths 704 are optimized to generate optimized paths 708. The optimized paths are generated after mapping the third path 108-3. For example, lanes are more evenly distributed (e.g., by varying path widths or spacing between paths) since the third path 108-3 is so close to one of the plurality of paths 704. In some embodiments, other optimizations are made. For example, speed of the vehicle or tool parameters (e.g., vibration) are optimized.

Figure 8:
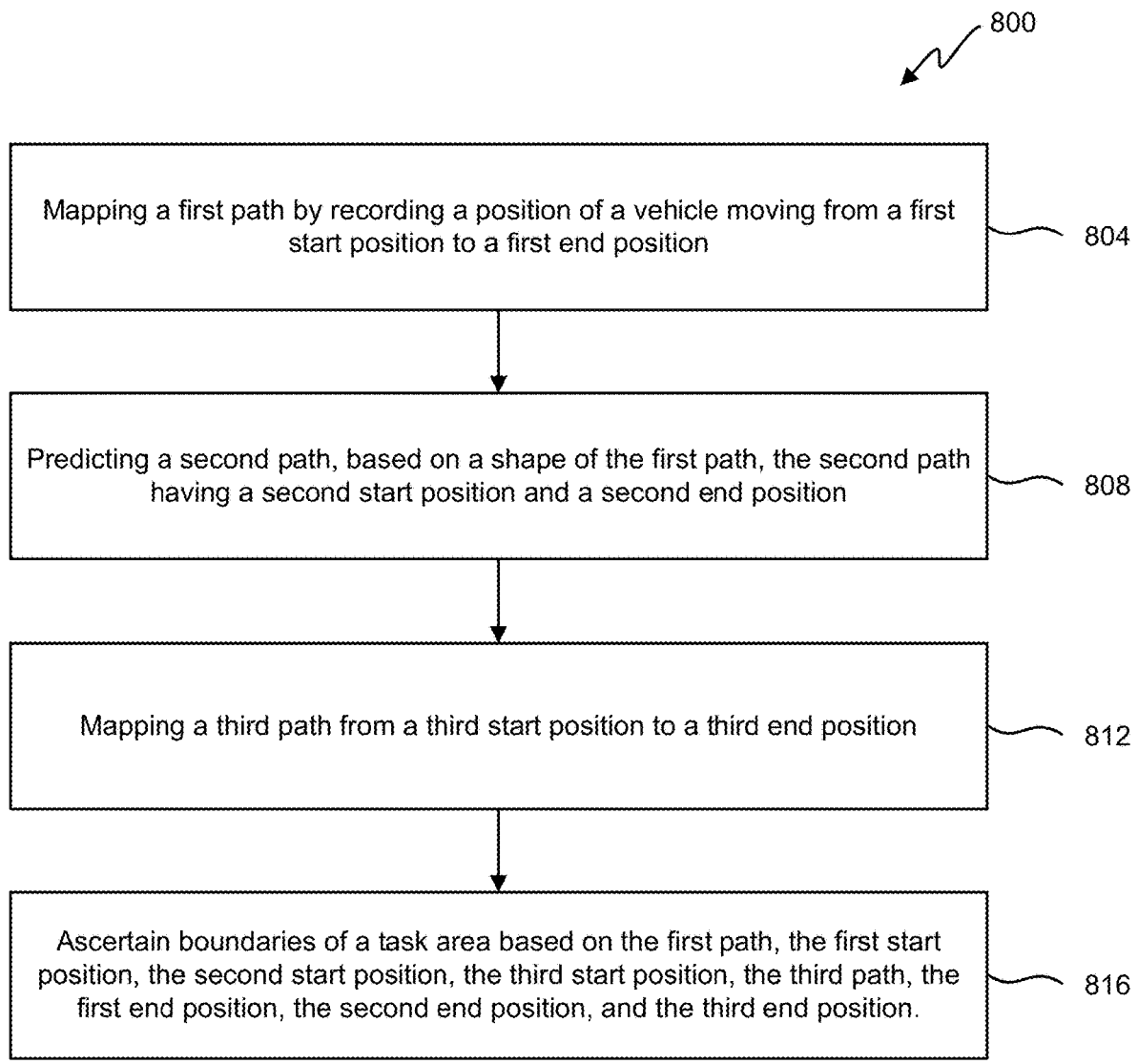
FIG. 8 illustrates a flowchart of an embodiment of a process for using a vehicle to ascertain boundaries of a task area at a construction site.

In FIG. 8, a flowchart for an embodiment of a process 800 for using a vehicle to ascertain boundaries of a task area at a construction site is shown. Process 800 begins in step 804 with mapping a first path by recording a position of a vehicle moving from a first start position to a first end position. A first input is received from an operator of the vehicle, while the vehicle is at the first start position. A position of the vehicle is recorded as the vehicle moves from the first start position. A second input is received from the operator of the vehicle. A first end position is recorded, based on receiving the second input from the operator. The first path of the vehicle is mapped based on the first start position, the first end position, and recording the position of the vehicle as the vehicle moves from the first start position to the first end position.

In step 808, a second path is predicted, based on a shape of the first path, the second path having a second start position and a second end position. Predicting the second path can be based on a shape of the first path. The second path has a second start position and a second end position. The vehicle can be automatically steered along the second path (e.g., with our without changes from the operator).

In step 812, a third path is mapped from a third start position to a third end position. The third path is defined by a third start position and a third end position. For example, the vehicle travels from the third start position to the third end position while the position of the vehicle is recorded.

In step 816, boundaries are ascertained. A first boundary of the task area defined by the first path. A second boundary (e.g., second boundary 204 in FIG. 2) of the task area is defined by the first end position, the second end position, and the third end position. A third boundary (e.g., third boundary 206 in FIG. 2) of the task area is defined by the third path. A fourth boundary (e.g., fourth boundary 208 in FIG. 2) of the task area is defined by the first start position, the second start position, and the third start position.

In some embodiments, a tool is coupled with the vehicle and the process comprises: recording a parameter of the tool while the vehicle traverses the first path (e.g., recording vibration, tool up/down, etc.); using the parameter of the tool while the vehicle is automatically steered along the second path; and/or automatically using the parameter of the tool along the second path. The speed of the vehicle on the predicted path is set to match a speed of the vehicle traversing the first path. Sometimes the vehicle traverses one path multiple times before going to another path.

In some embodiments, the second start position is on a line perpendicular to the first path at the first start position. The second start position can be separated from the first start position based on a percentage of a width of a tool of the vehicle or a percentage of a width of the vehicle. The process can include the vehicle returning to the first start position and automatically traversing the first path, the second path, and the third path, after mapping the third path.

A compactor can be used as an example of vehicle at a construction site. A bulldozer is used to level a portion of a construction site and the compactor is then used to compact the portion of the construction site. The compactor is repeatedly driven over a task area to firmly compact the soil. Compacting the task area is a highly repetitive task, which could be helpful to automate. The compactor compacts a lane, backs up on the lane, and then turns to start a new lane.

To automate (including semi-automating) the compacting process, corners or boundaries of the task area are used to keep the compactor within the task area. Surveying the boundaries of the task area, and/or driving the perimeter of the task area, can be time-consuming. Using processes described above, an operator of the compactor can begin work almost immediately. The operator provides an input to the compactor to start a first lane (e.g., by pressing a button on a display of the compactor). Sensors then monitor start point of the lane, speed (which can change based on the material being compacted), trajectory, tool information/use, and/or other information. When the user is at the end of the first lane, the operator provides an input to end the first lane. The first lane can then be the left edge boundary of the task area. The compactor can then repeat the first lane one or more times before moving to the second lane. The second lane can then be determined as a percentage width of a drum of the compactor. Compactor could then compact the second lane the same as the first lane using computer control of the compactor based on the sensor data tracking compaction of the first lane. Further lanes can be repeated until the operator provides an input (e.g., via the display) to stop at a final lane. The final lane can be used as a right edge boundary. Start positions of the lanes can be a bottom and boundary, and end positions of the lanes can be a top and boundary.

After the final lane, lanes can be optimized to even out compaction in the future. For example, the compactor (or another compactor) could be moved to the start of the first lane (e.g., either manually or automatically) and compact the task area (e.g., automatically) using the optimized lanes.

In some situations, lanes are curved. For example, when compacting a highway the highway can have a bend, or turn, in it. Shapes of predicted lanes can be extrapolated based on one or more previous lanes (e.g., by paralleling a previous path).

In some situations, starts and/or ends of lanes are not in a straight line. The operator of the compactor can indicate start and end positions of lanes. Thus, top and/or bottom boundaries need not be in a straight line. The user can amend lanes and/or functions (e.g., to slow to the compactor or to turn vibration on and off) by manual control override and/or using a user interface (e.g., the display). For example, if a previous lane had a bend in it, the user can select the next lane to be a straight line. Or the operator can turn off vibration for a portion of a lane.

The operator can teach the compactor (and/or another vehicle) to go around an object or to drive on a road or path through a construction site.

Examples of optimization include width optimization, lane overlap optimization, number of lanes optimization, number of passes (e.g., if the operator performed too many passes on a path, the number of passes can be reduced), transition area optimization (e.g., an area where the compactor turns to start a new lane), optimization for multiple vehicles and/or different classes of vehicles, tool on/off (e.g., vibration/no vibration; drum on/off), tool parameter (e.g., different vibe), blade load (e.g., for a dozer), blade depth (e.g., for a slot dozer), start and stop, and speed optimization of the vehicle.

For example, if the compactor is compacting a different material (e.g., gravel or asphalt compared to dirt), the speed of the compactor can be adjusted. In another example, clay could be compacted six times and asphalt compacted two times. Compactor vibration could be on while going forward and off while going backward. In some embodiments, a library of materials is used to aid in optimization. For example, different moisture content of different soils can be compacted at different speeds and/or number of times. In some embodiments, library is generated through a teaching process. For example, the operator enters into the display the material type being compacted and then compacts the material. The material type and compaction data (e.g., compactor speed, vibe setting, number of passes) stored in the library for future use with the compactor or another vehicle. In some embodiments the library can be shared as part of the teaching process. For example, a construction project brings in gravel from Site A. Workers may place (grade) material in a small area, compact it, test if its compacted, and/or repeat until its met compaction criteria. Data is saved for how many passes (and/or speed and/or compaction on/off) are used for gravel from Site A (the library entry). Saved data can be shared with other compactors. Sharing data can be part of an initial teaching stage. For example, the system learns that gravel from site A is to be compacted four times (e.g., without the explicit first step(s) of compact, test, and repeat). Later, or concurrently by another vehicle, compact, test, and repeat can be performed for gravel from Site B (e.g., because material from different sites may have different material properties).

In some situations, data from the compactor is used during automation. For example, some compactors have a sensor that indicates more or less compaction is needed. If a lane was automated to have six passes and sensor data from the compactor indicated the lane was sufficiently compacted after four passes on that lane, the compactor could progress to the next lane.

In some embodiments, a map (e.g., presented on the display) is used to select boundaries or initial boundaries. However, a map can have accuracy (e.g., resolution) problems or not be up to date. Thus, the teach and repeat process can be used to ascertain, or refine, boundaries based on a map.

Data from one vehicle can be shared with another vehicle. For example, a dozer could avoid and/or mark obstacles, avoidance in zones, or hazard zones in a task area and then transmit that data to the compactor. The compactor can then use and/or modify that data (e.g., the hazard was removed, or a new obstacle is in the task area) and transmit that data to a third vehicle. Thus, the third vehicle has up-to-date data on the task area. In some embodiments, an avoidance zone is an area where a vehicle should not go into (e.g., a ditch), where is a hazard zone is an area that an operator might get killed if entering that area.

In some situations, compactor can receive data about boundaries from another vehicle. For example, compactor can get data about a task area that was bladed based on blade lift data from a dozer. Areas of no cuts or no fills could indicate an obstacle for the compactor to avoid. Automation can help the compactor. Identifying boundaries and/or zones can last across multiple sessions. Each teach and repeat can cycle be an effective way for people to teach boundaries (e.g., irregular shapes) for vehicle automation (e.g., without the extra step of pre-surveying the boundaries).

Though examples are given using a compactor, techniques can be used in other situations. For example, techniques described can be used with a dozer (e.g., blade up/down; number of passes for a slot), ripping (e.g., teeth up/down), drone field missions, excavating, disking, water truck, placing lime, moving a lawn, and/or robotics (e.g., paths for Trimble Spot laser scanner). Processes described can be used in many situations where boundaries of an area are not well defined.

Figure 9:
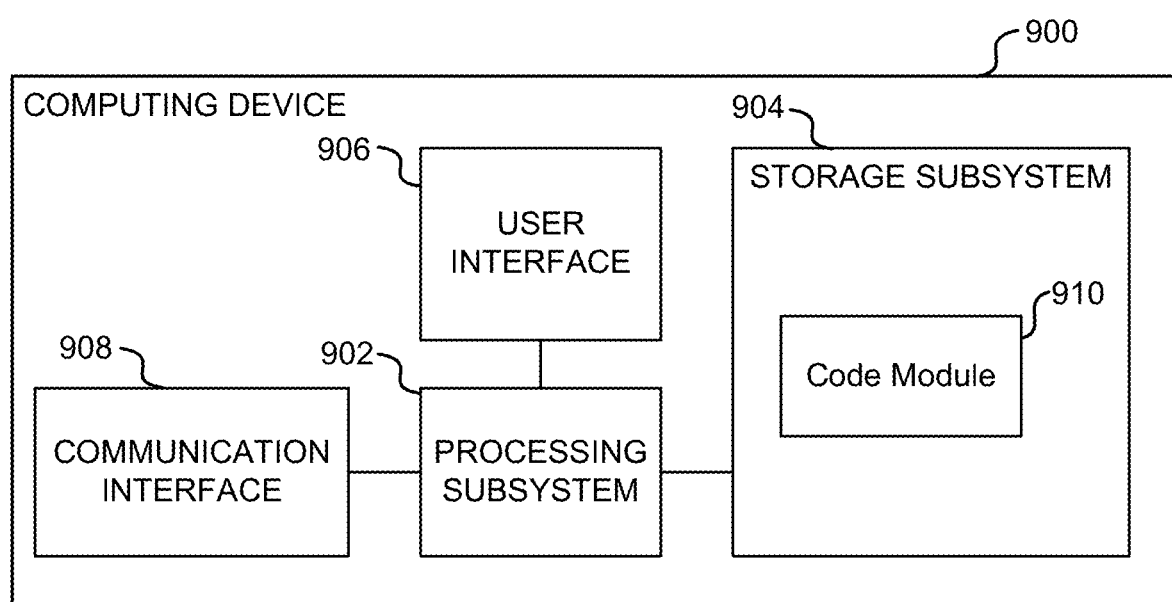
FIG. 9 depicts a block diagram of an embodiment of a computer system.

FIG. 9 is a simplified block diagram of a computing device 900. Computing device 900 can implement some or all functions, behaviors, and/or capabilities described above that would use electronic storage or processing, as well as other functions, behaviors, or capabilities not expressly described. Computing device 900 includes a processing subsystem 902, a storage subsystem 904, a user interface 906, and/or a communication interface 908. Computing device 900 can also include other components (not explicitly shown) such as a battery, power controllers, and other components operable to provide various enhanced capabilities. In various embodiments, computing device 900 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 904 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 904 can store one or more applications and/or operating system programs to be executed by processing subsystem 902, including programs to implement some or all operations described above that would be performed using a computer. For example, storage subsystem 904 can store one or more code modules 910 for implementing one or more method steps described above.

A firmware and/or software implementation may be implemented with modules (e.g., procedures, functions, and so on). A machine-readable medium tangibly embodying instructions may be used in implementing methodologies described herein. Code modules 910 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 910) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 910 may comprise sets of instructions (codes) embodied on a computer-readable medium that directs a processor of a computing device 900 to perform corresponding actions. The instructions may be configured to run in sequential order, in parallel (such as under different processing threads), or in a combination thereof. After loading a code module 910 on a general purpose computer system, the general purpose computer is transformed into a special purpose computer system.

Computer programs incorporating various features described herein (e.g., in one or more code modules 910) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 904 can also store information useful for establishing network connections using the communication interface 908.

User interface 906 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 906 to invoke the functionality of computing device 900 and can view and/or hear output from computing device 900 via output devices of user interface 906. For some embodiments, the user interface 906 might not be present (e.g., for a process using an ASIC).

Processing subsystem 902 can be implemented as one or more processors (e.g., integrated circuits, one or more single-core or multi-core microprocessors, microcontrollers, central processing unit, graphics processing unit, etc.). In operation, processing subsystem 902 can control the operation of computing device 900. In some embodiments, processing subsystem 902 can execute a variety of programs in response to program code and can maintain multiple concurrently executing programs or processes. At a given time, some or all of a program code to be executed can reside in processing subsystem 902 and/or in storage media, such as storage subsystem 904. Through programming, processing subsystem 902 can provide various functionality for computing device 900. Processing subsystem 902 can also execute other programs to control other functions of computing device 900, including programs that may be stored in storage subsystem 904.

Communication interface 908 can provide voice and/or data communication capability for computing device 900. In some embodiments, communication interface 908 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 908 can provide wired connectivity (e.g., universal serial bus, Ethernet, universal asynchronous receiver/transmitter, etc.) in addition to, or in lieu of, a wireless interface. Communication interface 908 can be implemented using a combination of hardware (e.g., driver circuits, antennas, modulators/demodulators, encoders/decoders, and other analog and/or digital signal processing circuits) and software components. In some embodiments, communication interface 908 can support multiple communication channels concurrently. In some embodiments, the communication interface 908 is not used.

It will be appreciated that computing device 900 is illustrative and that variations and modifications are possible. A computing device can have various functionality not specifically described (e.g., voice communication via cellular telephone networks) and can include components appropriate to such functionality.

Further, while the computing device 900 is described with reference to particular blocks, it is to be understood that these blocks are defined for convenience of description and are not intended to imply a particular physical arrangement of component parts. For example, the processing subsystem 902, the storage subsystem 904, the user interface 906, and/or the communication interface 908 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Electronic devices described herein can be implemented using computing device 900.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. A system for using a vehicle in a construction environment to ascertain boundaries of a task area within the construction environment, the system comprising:
   the vehicle, the vehicle comprising a construction implement; and
   one or more memory devices coupled with the vehicle containing instructions that, when executed by one or more processors, perform the following steps:
   receiving a first input from an operator of the vehicle while the vehicle is at a first start position;
   recording a position of the vehicle as the vehicle moves from the first start position;
   receiving a second input from the operator;
   recording a first end position, based on receiving the second input from the operator;
   mapping a first path of the vehicle based on the first start position, the first end position, and recording the position of the vehicle as the vehicle moves from the first start position to the first end position;
   predicting a second path, based on a shape of the first path, wherein the second path has a second start position and a second end position;
   automatically steering the vehicle along the second path;
   mapping a third path, the third path being defined by a third start position and a third end position, wherein there are a plurality of paths between the second path and the third path;
   recording properties of the construction implement as the vehicle traverses the first path, the second path, the plurality of paths, and the third path;
   ascertaining the boundaries of the task area, after mapping the first path and the second path, based on:
   a first boundary of the task area defined by the first path;
   a second boundary of the task area defined by the first end position, the second end position, and the third end position;
   a third boundary of the task area defined by the third path; and a fourth boundary of the task area defined by the first start position, the second start position, and the third start position; and controlling the steering of the vehicle, speed of the vehicle, and one or more properties of the construction implement of the vehicle to automatically repeat a construction task within the task area, after ascertaining the boundaries of the task area.

2. The system of claim 1, wherein the properties of the construction implement recorded comprises vibration, blade load, or blade depth.

3. The system of claim 1, the system further comprising a tool coupled with the vehicle, and the instructions further cause the one or more processors to:
record a parameter of the tool while the vehicle traverses the first path; and
using the parameter of the tool while the vehicle is automatically steered along the second path.

4. The system of claim 1, the system further comprising a display coupled with the vehicle, wherein:
the display is a computer coupled with the vehicle configured to receive operator input and to display graphical information to the operator of the vehicle; and
the first input and the second input are received at the display.

5. The system of claim 4, wherein the instructions further cause the one or more processors to amend the second path based on receiving input from the operator via the display.

6. A method for using a vehicle to ascertain boundaries of a task area, the method comprising:
receiving a first input from an operator of the vehicle in a construction environment while the vehicle is at a first start position;
recording a position of the vehicle as the vehicle moves from the first start position;
receiving a second input from the operator;
recording a first end position, based on receiving the second input from the operator;
mapping a first path of the vehicle based on the first start position, the first end position, and recording the position of the vehicle as the vehicle moves from the first start position to the first end position;
predicting a second path, based on a shape of the first path, wherein the second path has a second start position and a second end position;
automatically steering the vehicle along the second path;
mapping a third path, the third path being defined by a third start position and a third end position, wherein there are a plurality of paths between the first path and the third path;
ascertaining the boundaries of the task area in the construction environment based on:
a first boundary of the task area defined by the first path;
a second boundary of the task area defined by the first end position, the second end position, and the third end position;
a third boundary of the task area defined by the third path; and
a fourth boundary of the task area defined by the first start position, the second start position, and the third start position; and
optimizing the plurality of paths, wherein optimizing the plurality of paths includes lane overlap optimization or optimization of a number of passes by a construction vehicle.

7. The method of claim 6, wherein the operator is in the vehicle while receiving the first input and while receiving the second input.

8. The method of claim 6, further comprising stopping and reversing the vehicle between the first end position and the second start position.

9. The method of claim 6, wherein optimizing the plurality of paths is performed after mapping the third path.

10. The method of claim 6, further comprising the vehicle returning to the first start position and then automatically traversing the first path, the second path, and the third path, after mapping the third path.

11. The method of claim 6, wherein the second start position is separated from the first start position based on a percentage of a width of a tool of the vehicle.

12. The method of claim 6, further comprising recording a speed of the vehicle along the first path and automatically steering the vehicle along the second path at the speed of the vehicle recorded along the first path.

13. The method of claim 6, further comprising:
recording a parameter of a tool of the vehicle along the first path; and
automatically using the parameter of the tool along the second path.

14. The method of claim 6, further comprising identifying an obstacle based on the plurality of paths.

15. The method of claim 6, further comprises transmitting the boundaries and optimized paths to another vehicle.

16. A non-transitory computer-readable medium comprising instructions that, when executed by one or more processors, perform the following steps: receiving a first input from an operator of a vehicle while the vehicle is at a first start position; recording a position of the vehicle as the vehicle moves from the first start position; receiving a second input from the operator; recording a first end position, based on receiving the second input from the operator; mapping a first path of the vehicle based on the first start position, the first end position, and recording the position of the vehicle as the vehicle moves from the first start position to the first end position; predicting a second path, based on a shape of the first path, wherein the second path has a second start position and a second end position; and automatically steering the vehicle along the second path; mapping a third path, the third path being defined by a third start position and a third end position, wherein there are a plurality of paths between the first path and the third path; ascertaining boundaries of a task area based on: a first boundary of the task area defined by the first path; a second boundary of the task area defined by the first end position, the second end position, and the third end position; a third boundary of the task area defined by the third path; and a fourth boundary of the task area defined by the first start position, the second start position, and the third start position; identifying an obstacle between adjacent paths of the plurality of paths; and transmitting a location of the obstacle to another vehicle.

17. The non-transitory computer-readable medium of claim 16, wherein: the instructions further cause the one or more processors to optimize the plurality of paths, after mapping the third path; and optimization includes optimizing path spacing such that optimized paths are different than some recorded paths.

18. The non-transitory computer-readable medium of claim 17, wherein the vehicle is a different type of construction vehicle, for a different type of construction task, than the another vehicle.

19. The non-transitory computer-readable medium of claim 16, wherein the second start position is separated from the first start position based on a percentage of a width of a tool of the vehicle.

20. The non-transitory computer-readable medium of claim 16, wherein: the vehicle is a first vehicle; the instructions further cause the one or more processors to transmit at least a portion of the first path to a second vehicle before the first vehicle traverses the second path; and the second path is based on a path of the second vehicle.

\* \* \* \* \*